US006606777B2

(12) United States Patent
Soloway et al.

(10) Patent No.: US 6,606,777 B2
(45) Date of Patent: Aug. 19, 2003

(54) METHOD OF INSTALLING AN ALARM SENSOR TO A CORNER WALL

(75) Inventors: Richard L. Soloway, Amityville, NY (US); Frank J. Ioco, Amityville, NY (US)

(73) Assignee: Napco Security Systems, Inc., Amityville, NY (US)

(*) Notice: Subject to any disclaimer, the term of this patent is extended or adjusted under 35 U.S.C. 154(b) by 0 days.

(21) Appl. No.: 10/280,754

(22) Filed: Oct. 25, 2002

(65) Prior Publication Data

US 2003/0071741 A1 Apr. 17, 2003

Related U.S. Application Data

(62) Division of application No. 09/781,938, filed on Feb. 12, 2001, now Pat. No. 6,494,425.

(51) Int. Cl.[7] ........ B23P 11/00
(52) U.S. Cl. ........ 29/432; 248/217.3
(58) Field of Search ........ 403/231, 322.1, 403/252; 411/21; 174/50.52, 50.54; 29/432; 248/220.1, 906, 217.3, 216.1; 340/693.5, 693.9, 693.11

(56) References Cited

U.S. PATENT DOCUMENTS 1,856,356 A * 5/1932 Owen
2,423,757 A * 7/1947 Dedge
2,770,436 A * 11/1956 Linhardt, Jr.
2,963,253 A * 12/1960 Maier et al.
3,018,080 A * 1/1962 Loudon
3,187,084 A * 6/1965 Stillman et al.
4,391,428 A * 7/1983 Grimes

* cited by examiner

*Primary Examiner*—Douglas Olms
*Assistant Examiner*—Steven A Blount
(74) *Attorney, Agent, or Firm*—John R. Mugno

(57) ABSTRACT

A security alarm sensor for mounting between two corner walls is described comprising a housing unit having a housing base for attachment to the corner walls and a selectively detachable housing cover; a circuit board sized for engagement within the housing unit; first and second openings on opposite sides of the housing base; first and second mounting pins selectively movable within the first and second openings wherein said mounting pins have a length and a range of movement so as to have a first position wherein the mounting pins are totally retracted within the housing unit and a second position wherein said mounting pins extend outwardly from the housing unit sufficiently to pierce the corner walls and securely hold the security alarm sensor in place. The installation of the alarm sensor is usually accomplished by first removing the housing cover from the housing base and detaching the printed circuit board prior to mounting the housing base to the corner of the wall.

4 Claims, 3 Drawing Sheets

METHOD OF INSTALLING AN ALARM SENSOR TO A CORNER WALL

This application is a divisional application Ser. No. 09/781,938 filed on Feb. 12, 2001 now U.S. Pat. No. 6,494,425.

FIELD OF THE INVENTION

This invention is generally directed to an apparatus and method for mounting security alarm sensors within a protected premises. More specifically, the apparatus and method of the present invention provides a means for easily connecting a security alarm sensor in a corner of a room with minimal risk to the circuitry and without utilizing any screws, nails or mounting brackets.

BACKGROUND OF THE INVENTION

Burglaries, and the perceived risk thereof, have continually increased, particularly in crowded urban areas. Thus, an increasing number of businesses and homes are protected by alarm systems. Most alarm systems comprise an alarm control panel; a series of detectors, sensors and/or door/perimeter contacts; and a user-controlled keypad. Most sensors/detectors are strategically placed within a protected premises by a skilled installer so as to maximize the detection of unauthorized intruders while minimizing the risk of false alarms caused by heaters, open windows, pets, etc. Various sensors/detectors exist which can detect the motion or heat caused by an unauthorized intruder when the alarm system is armed. Examples of such sensors/detectors include passive infrared (PIR) sensors, microwave sensors, ultrasonic devices, etc. Many conventional sensors utilize dual technology devices which combine complementary technologies to minimize false alarms.

The most effective and least unsightly position for many sensors is in the corner of a room. However, it is often difficult for an installer to securely fasten the sensor in the corner of a room without either utilizing a corner mounting bracket or preventing damage to the housing base or alarm circuitry when awkwardly connecting screws through standard corner mount screw holes. If precise placement of the sensor/detector is not made, its proper functioning is greatly jeopardized.

Most conventional security alarm sensors are packaged as an integrated housing unit. This housing unit includes a selectively attached housing base and housing cover with a printed circuit board contained therein. The installer will typically remove the housing cover from the housing base to expose the printed circuit board contained therein. Next, the installer will carefully remove the printed circuit board from the housing base to prepare the housing base for installation to a wall. The printed circuit board is removed to minimize the risk of tools damaging the circuitry thereof. The housing base is either securely fastened in a corner of a room by means of a mounting bracket or by screws inserted through standard corner mount screw holes. In either case, mounting is typically slow and awkward due to the difficulty of inserting screws at an angle while on a ladder. Obviously, in order to securely fasten the housing base to the wall, at least two, and preferably four, corner mounting screws must be used. Once the housing base is in place, the installer will reinsert the printed circuit board and reattach the housing cover.

Whenever screws are utilized by an installer, particularly when on a ladder, they are often dropped, lost, etc. requiring even additional installation time and inconvenience for the installer. Thus, labor costs for installation companies are high. Thus, what is lacking in the prior art is a housing unit and method which permits corner mounting without the need for utilizing a corner mounting bracket or any screws whatsoever. Whether mounting brackets or screws are utilized, if the installer needs to reposition the sensor for any reason, the walls will now contain damage due to screw holes. Thus, repair plastering sometimes is warranted. This further increases the costs to installation companies.

It is therefore a primary object of the present invention to provide a new and improved method and apparatus for mounting a security alarm sensor to the corner of a wall.

It is another object of the present invention to provide a new and improved method and apparatus for mounting a security alarm sensor to the corner of a wall without utilizing mounting brackets or screws.

It is yet a further object of the present invention to provide a new and improved method and apparatus for mounting a security alarm sensor to the corner of a wall that, can be easily repositioned without creating any unsightly holes on the walls.

Other objects and advantages of the present invention will become apparent from the specification and the drawings.

SUMMARY OF THE INVENTION

Briefly stated and in accordance with the preferred embodiment of the present invention, a security alarm sensor for mounting between two corner walls is described comprising a housing unit having a housing base for attachment to the corner walls and a selectively detachable housing cover; a circuit board sized for engagement within the housing unit; first and second openings on opposite sides of the housing base; first and second mounting pins selectively movable within the first and second openings wherein said mounting pins have a length and a range of movement so as to have a first position wherein the mounting pins are totally retracted within the housing unit and a second position wherein said mounting pins extend outwardly from the housing unit sufficiently to pierce the corner walls and securely hold the security alarm sensor in place. The installation of the security alarm sensor is usually accomplished by first removing the housing cover from the housing base and detaching the printed circuit board prior to mounting the housing base to the corner of the wall.

BRIEF DESCRIPTION OF THE DRAWINGS

While the specification concludes with claims particularly pointing out and distinctly claiming the subject matter regarded as the invention herein, it is believed that the present invention will be more readily understood upon consideration of the description, taken in conjunction with the accompanying drawings, wherein:

DESCRIPTION OF THE PREFERRED EMBODIMENT

Figure 1:
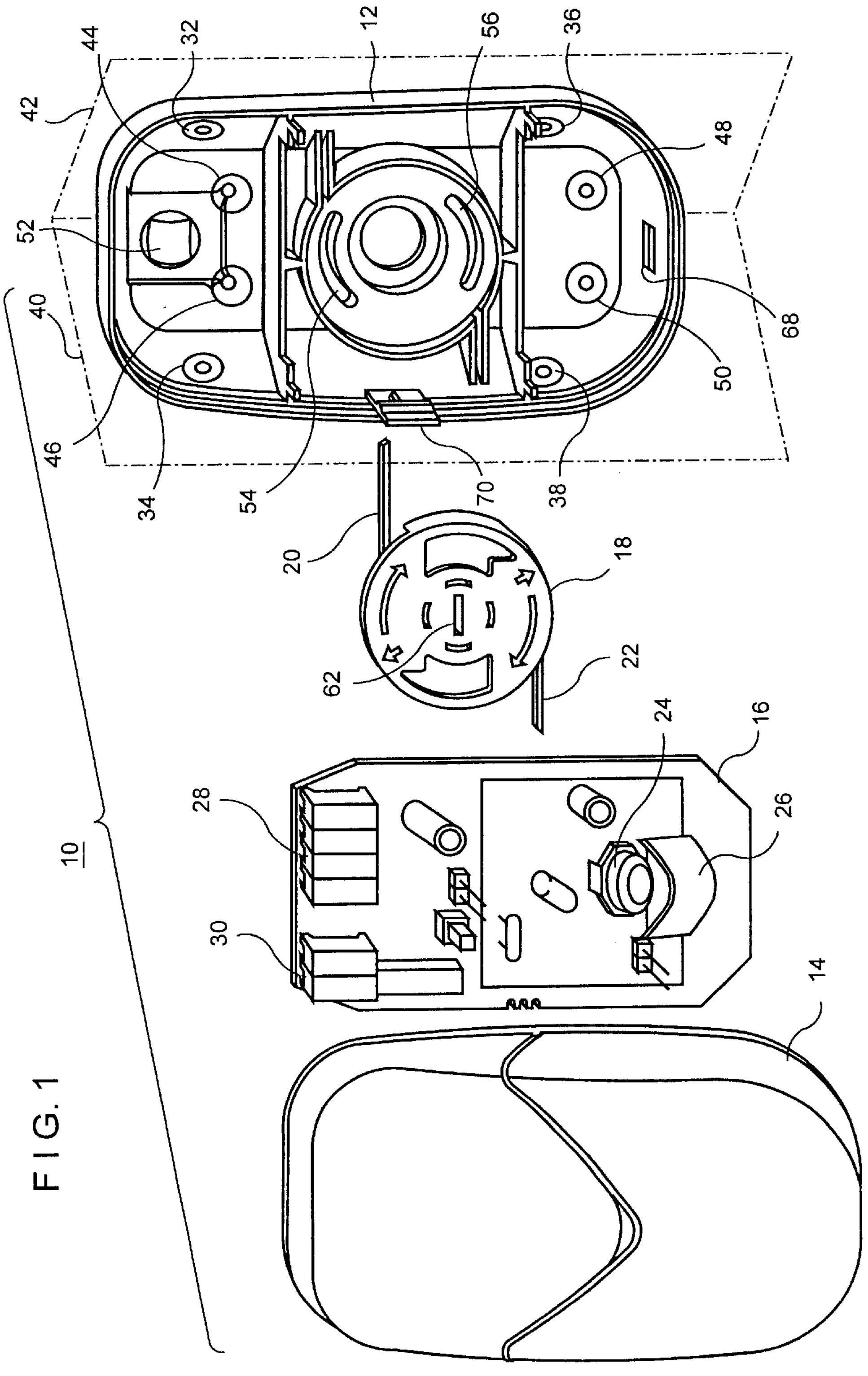
FIG. 1 is an exploded view of an alarm sensor in accordance with the present invention which includes a housing unit comprising a housing base and a housing cover, a printed circuit board, and a rotatable mounting disc.

Referring first to FIG. 1, an alarm sensor in accordance with the present invention is generally designated by reference numeral 10 and shown in exploded form. A housing unit comprised of a housing base 12 and a housing cover 14 is shown. Within housing base 12 and housing cover 14 is a printed circuit board 16 and a rotatable mounting disc 18. Although shown as coupled to mounting disc 18, a first mounting pin 20 and a second mounting pin 22 are typically separate from mounting disc 18 and extend outwardly in generally opposite directions.

Printed circuit board 16 is shown as a PIR sensor for illustrative purposes. Thus, printed circuit board 16 includes a PIR sensor element 24 and a PIR lens 26. Also on printed circuit board 16 are terminal strips 28 and 30. Terminal strips 28 and 30 are preferably comprised of "speaker-jack style" terminals which simply snap down to secure connecting wires. Thus, no terminal screws are necessary. In the instance where alarm sensor 10 is a PIR sensor, housing cover 14 can also be split in two components to allow for dual focal lengths for the PIR zones. Dual focal lengths are often incorporated in PIR sensors to eliminate false alarms due to pets. It will be noted by those skilled in the art that the mounting apparatus and method of the present invention can be utilized not only for PIR sensors, but also for various security alarm sensors based on microwave technology, ultrasound technology, or any variations thereof. Furthermore, the mounting apparatus and method of the present invention is equally applicable to alarm sensors for fire, smoke, temperature, etc. Additionally, the mounting apparatus and method of the present invention can be utilized on hardwired or wireless sensors. Thus, the actual components shown on printed circuit board 16 are only illustrative; countless variations are possible.

Housing base 12 includes corner mount screw hole punch-outs 32, 34, 36 and 38. An installer can selectively utilize screws through corner mount screw holes punch-outs 32, 34, 36 and 38 to mount housing base 12 onto corner walls 40 and 42. Similarly, housing base 12 illustrates four flat wall mount screw hole punch-outs 44, 46, 48 and 50. An installer will selectively utilize flat wall mount screw hole punch-outs 44, 46, 48 and 50 when the housing base is to be installed onto a flat wall. Finally, housing base 12 also includes a swivel mount punch-out 52 that allows installation so that alarm sensor 10 can be made to slightly rotate. While the alternative utilization of corner mount screw hole punch-outs 32, 34, 36 and 38; flat wall mount screw hole punch-outs 44, 46, 48 and 50; or swivel mount punch-out 52 allows a single housing unit to be incorporated in various applications, a screwdriver is required for all installations. Particularly when a corner mounting is desired, the use of screws and a screwdriver on a ladder is often burdensome.

Figure 3:
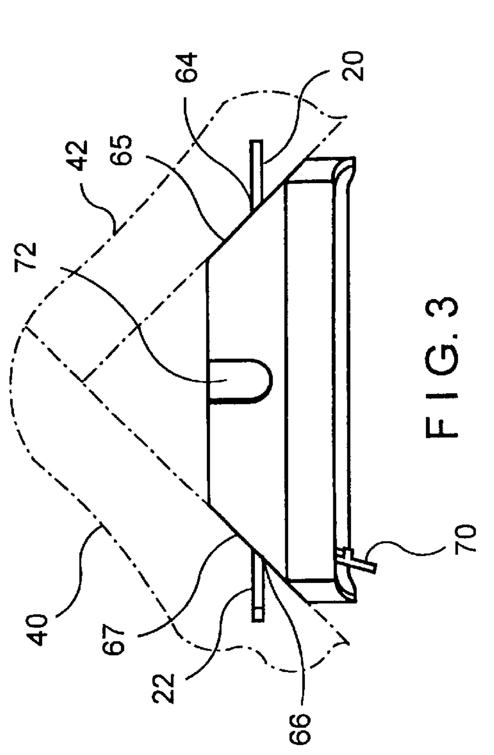
FIG. 3 is a schematic illustration of the housing base of the present invention being installed between two corner walls.
Figure 2:
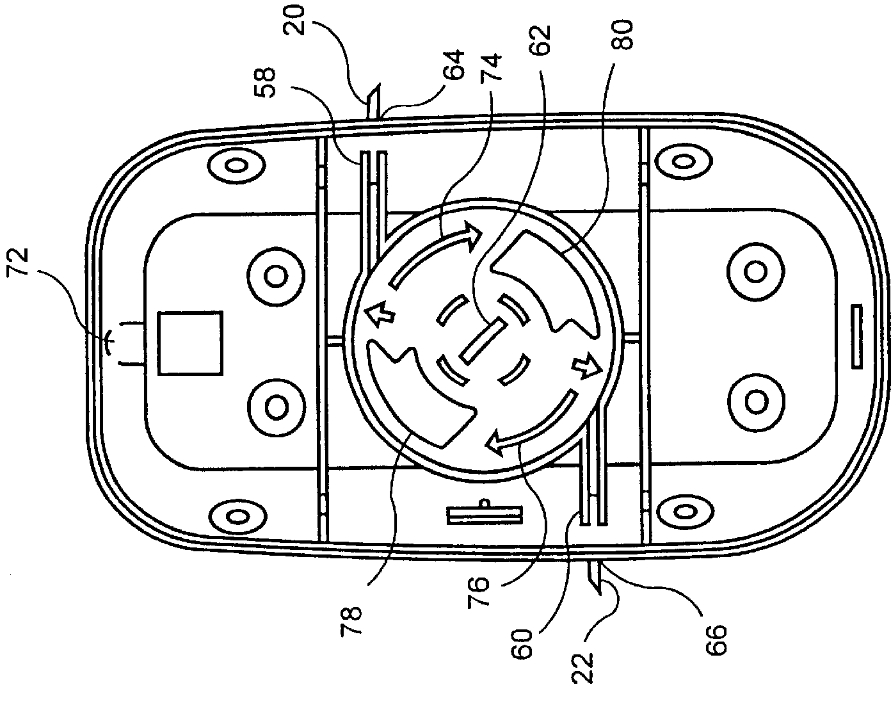
FIG. 2 is a schematic illustration of the housing base and the rotatable mounting disc in accordance with the present invention.

Housing base 12 is adapted to receive rotatable mounting disc 18, first mounting pin 20, and second mounting pin 22. More specifically, housing base 12 includes a first guided groove 54, a second guided groove 56, a first guide slot 58 and a second guide slot 60. As best shown in FIG. 2, first guide slot 58 permits a path upon which first mounting pin 20 can easily travel whereas second guide slot 60 permits a path upon which second mounting pin 22 can easily travel. Based on the proper manipulation of rotatable mounting disc 18 by means of a screwdriver slot 62, first mounting pin 20 can be made to either retract within or extend beyond a first opening 64 on housing base 12. Similarly, second mounting pin 22 can be made to either retract within or extend beyond a second opening 66 on housing base 12. First opening 64 and second opening 66 are typically on respective planes 65 and 67 of housing base 12 which are contoured at approximately 45° angles. This angle permits planes 65 and 67 to rest flatly on corner walls 40 and 42 that generally form a 90° angle. This flush alignment is best seen in FIG. 3.

Before addressing the interconnection between rotatable mounting disc 18 and housing base 12, and the manipulation of mounting disc 18 to control the selective movement of first mounting pin 20 and second mounting pin 22, it should be understood that alarm sensor 10 is typically packaged as a interconnected unit. Housing base 12 is snapped together to housing cover 14 with circuit board 16 and mounting disc 18 therein. In order to separate housing base 12 from housing cover 14, a screwdriver is typically inserted into a slot 68 to release a mounting tab (not shown) that holds housing unit 12 and housing base 14 together. At this stage, printed circuit board 16 is coupled to housing base 12 by means of a circuit board height index tab 70. When slight pressure is applied to circuit board height index tab 70, circuit board 16 can be easily removed. Circuit board 16 can be wired at this point so that when ultimately replaced within housing base 14, the wires can be easily displaced through the housing unit by means of a wire entry punch-out 72. Obviously, wireless sensors would not require wire entry punch-out 72.

Once housing base 12 and housing cover 14 have been separated and circuit board 16 has been removed, housing base 12 is ready for mounting to walls 40 and 42. An installer will simply hold housing base 12 at a desired location, insert a screwdriver into screwdriver slot 62 and turn rotatable mounting disc 18 approximately 45°. The rotational movement of mounting disc 18 will result in first mounting pin 20 and second mounting pin 22 simultaneously moving outwardly so as to sufficiently pierce walls 40 and 42 and secure housing base 12 in place. At this point, printed circuit board 16 would be reconnected to housing base 12 by manipulating circuit board index tab 70 and housing cover 14 would be snapped onto housing base 12.

FIGS. 2–6 will assist demonstrating precisely how rotational movement of mounting disc 18 results in appropriate linear movement of first mounting pin 20 and second mounting pin 22 to selectively, but securely, attach alarm sensor 10 to corner walls 40 and 42. As seen in FIG. 2, rotatable mounting disc 18 includes optional directional arrows 74 and 76 to instruct an installer in the direction rotatable mounting disc 18 should be rotated to connect housing base 12 to walls 40 and 42. FIG. 2 demonstrates the position wherein rotatable mounting disc 18 has already been turned clockwise so that first mounting pin 20 and second mounting pin 22 extend outwardly from housing base 12. Instead of utilizing a screwdriver in screwdriver slot 62, it may be possible to utilize thumb turns 78 and 80 to rotate mounting disc 18.

Figure 4:
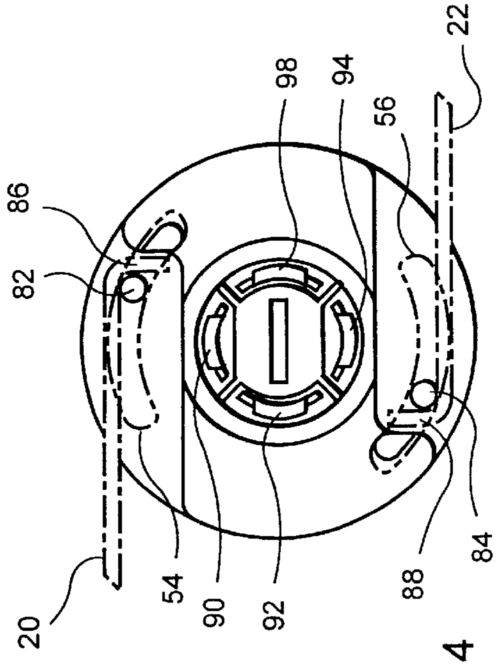
FIG. 4 is a schematic illustration of the back of the housing base of the housing base and rotatable mounting disc in accordance with the present invention wherein mounting pins are in their retractable position.

In the preferred embodiment of the present invention, a mechanism has been provided to prevent over-rotation of mounting disc 18 which would cause damage to first mounting pin 20 and second mounting pin 22. Referring to FIG. 4, it is shown that rotatable mounting disc 18 includes a first protruding knob 82 and a second protruding knob 84. First protruding knob 82 travels along first guided groove 54 whereas second protruding knob 84 travels along second guided groove 56. A first non-protruding engagement end 86 of first mounting pin 20 rests loosely between first protruding knob 82 and a raised portion of mounting disc 18. Similarly, a second non-protruding engagement end 88 of second mounting pin 22 rests loosely between second protruding knob 84 and a raised edge of mounting disc 18. First non-protruding engagement end 86 and second non-protruding engagement end 88 preferably extend at approximately 90° angles respectively from the rest of first mounting pin 20 and second mounting pin 22.

Figure 5:
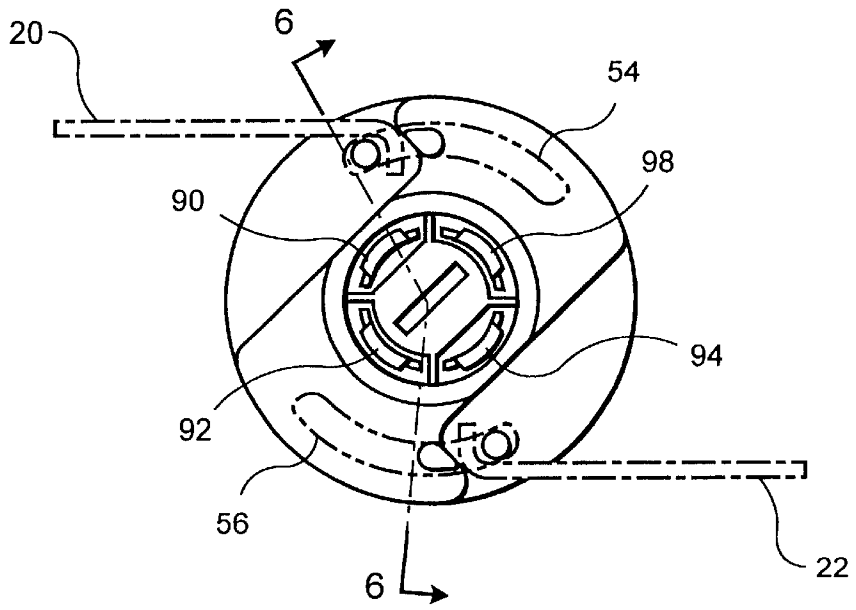
FIG. 5 is a schematic illustration of the back of the housing base of the housing base and rotatable mounting disc in accordance with the present invention wherein mounting pins are in their extended position.

FIG. 4 shows the back of housing base 12 and mounting disc 18 in a position wherein first mounting pin 20 and second mounting pin 22 are retracted within housing base 12. Conversely, FIG. 5 shows the back of housing base 12 and mounting disc 18 in a position wherein first mounting pin 20 and second mounting pin 22 are extended beyond housing base 12. This difference is caused by an approximately 45° turn of mounting disc 18 from the inside of housing base 12. As shown in FIG. 4 and FIG. 5, mounting disc 18 has been connected to housing base 12 by pressure mounting tabs 90, 92, 94 and 96. While experimentation has shown that mounting disc 18 is most securely attached to housing base 12 by utilizing four pressure mounting tabs, it is also possible to use two pressure mounting tabs. The utilization of pressure mounting tabs is preferred since, should mounting disc 18 break it is easy to attach a new one to the existing housing base without replacing the entire housing unit. However, there are many alternative techniques of connecting mounting disc 18 to housing base 12 that will become apparent to those skilled in the art.

Figure 6:
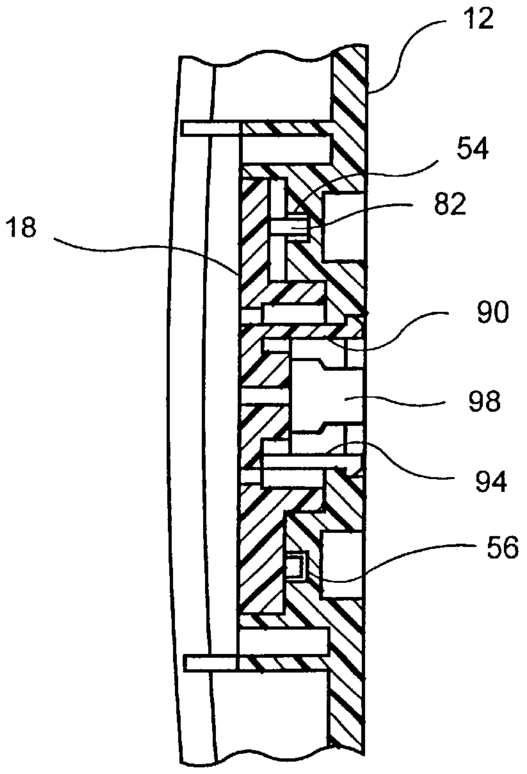
FIG. 6 is a cross-sectional view of FIG. 5 taken along reference line 6—6.

FIG. 6 is a cross-sectional view of FIG. 5 taken along reference line 6—6 and effectively shows the different components and shapes of components utilized in the preferred embodiment of the present invention. Of significant importance in the preferred embodiment is the fact that not only can housing base 12 be easily installed to corner walls 40 and 42, but, should the installer have made an error, the device is as easily removable and reinstalled at a new position. The pins are sufficiently narrow so as to cause only negligible damage to any wall. Whether rotating mounting disc 18 to either retract or extend first mounting pin 20 and second mounting pin 22, first guided groove 54 and second guided groove 56 prevent over-rotation of mounting disc 18 in any direction. Thus, any potential damage to first mounting pin 20 and second mounting pin 22 is eliminated.

Although, through experimentation, the rotation of mounting disc 18 has been shown to be the best mode for achieving selective linear movement of first mounting pin 20 and second mounting pin 22 from a first retracted position to a second extended position, the utilization of other means is also foreseen. For instance, the mounting pins can be selectively moved by means of a thumb-controlled, ratcheted device similar to a smaller version of a car jack, by a geared wheel-turn, by a locked collar apparatus, or by other means known in the art for applying sufficient and selective torque to the mounting pins. The various means for achieving selective, linear movement of the mounting pins should be sufficiently small so as not to interfere with the replacement of the printed circuit board on the housing base.

It will be apparent from the foregoing description that the present invention provides a new and improved method and apparatus for providing an easy connection of an alarm sensor to the corner of a room with minimal risk to the circuitry and without utilizing of any screws, nails or mounting brackets. While a specific preferred embodiment has been described, many variations may be utilized. For instance, although both first mounting pin 20 and second mounting pin 22 have been shown to incorporate only a single prong, double pronged pins (similar to staples) can be incorporated. Additionally, first mounting pin 20 and second mounting pin 22 can be threaded pins in certain variations. Moreover, while rotatable mounting disc 18 has been shown as being generally circular and of a composite material, it can indeed take various shapes as long as its rotational movement will result in basic linear movement of first mounting pin 20 and second mounting pin 22.

While there has been shown and described what is presently considered to be the preferred embodiment of this invention, it will be obvious to those skilled in the art that various changes and modifications may be made without departing from the broader aspects of this invention. For instance, the preferred embodiment has described a single rotatable mounting disc 18, which upon proper manipulation, simultaneously moves both first mounting pin 20 and second mounting pin 22. It is certainly foreseen that separate mounting discs could be utilized for each mounting pin, particularly if the device is wide. Moreover, while a particular means for separating the housing base from the housing cover and the printed circuit board from the housing base has been shown, many variations exist in the art.

It is, therefore, aimed in the appended claims to cover all such changes and modifications as fall within the true scope and spirit of the invention.

We claim:

1. A method of securing a housing base of an alarm sensor having a rotatable mounting disc, and first and second opposing and selectively retractable mounting pins to a corner wall without screws comprising the steps of:

holding said housing unit at a desired height on said corner walls; and turning said mounting disc so that said first and second mounting pins pierce said corner wall.

2. The method of claim 1 wherein said turning step is performed by hand.

3. The method of claim 1 wherein said turning step is performed by a screwdriver.

4. A method of securing a housing base of an alarm sensor having first and second opposing and selectively retractable mounting pins, and means coupled to said housing base for selectively moving said first and second mounting pins to a corner wall without screws comprising the steps of:

holding said housing unit at a desired height on said corner walls; and manipulating said means for selectively moving said first and second mounting pins so that said first and second mounting pins pierce said corner wall.

* * * * *